April 9, 1935.  J. P. REMINGTON  1,997,267
LAUNDRY SYSTEM
Filed March 4, 1932   5 Sheets-Sheet 1
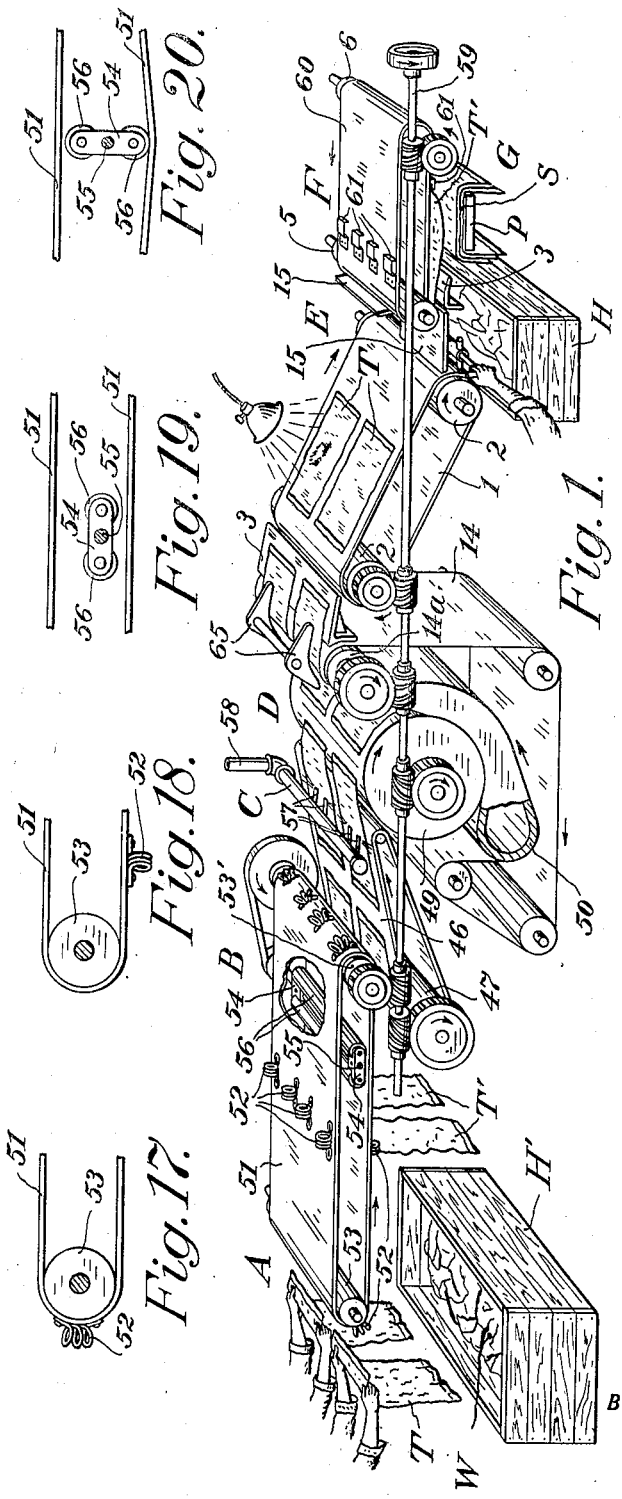
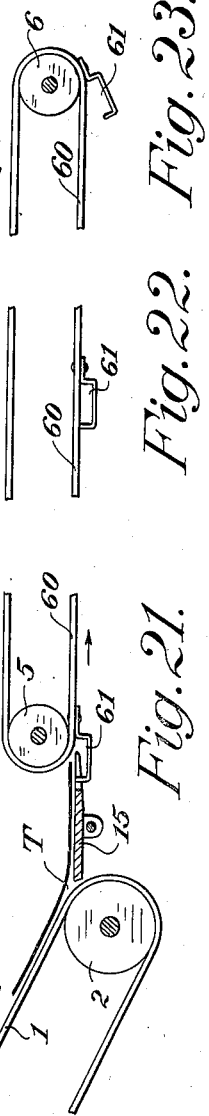
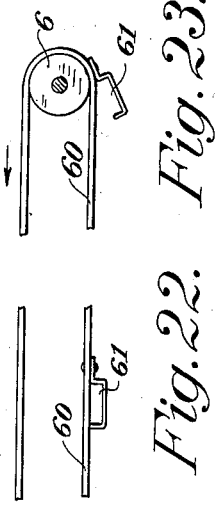
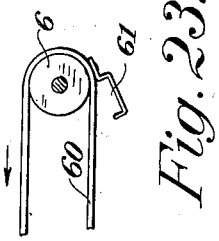
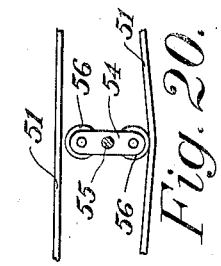
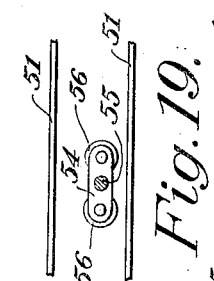
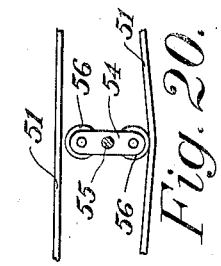
INVENTOR.
Joseph P. Remington
BY
Cornelius S. Chet
ATTORNEY.

April 9, 1935. J. P. REMINGTON 1,997,267
LAUNDRY SYSTEM
Filed March 4, 1932 5 Sheets-Sheet 2

INVENTOR.
Joseph P. Remington
BY
Cornelius D. Street
ATTORNEY.

April 9, 1935.  J. P. REMINGTON  1,997,267
LAUNDRY SYSTEM
Filed March 4, 1932   5 Sheets-Sheet 3
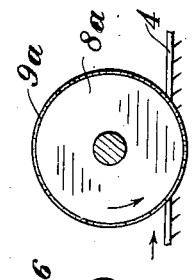
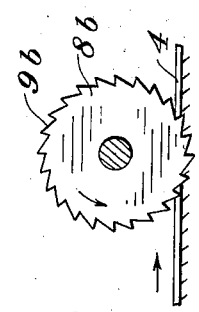
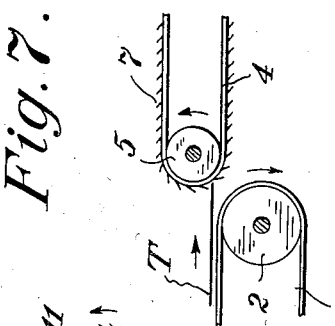
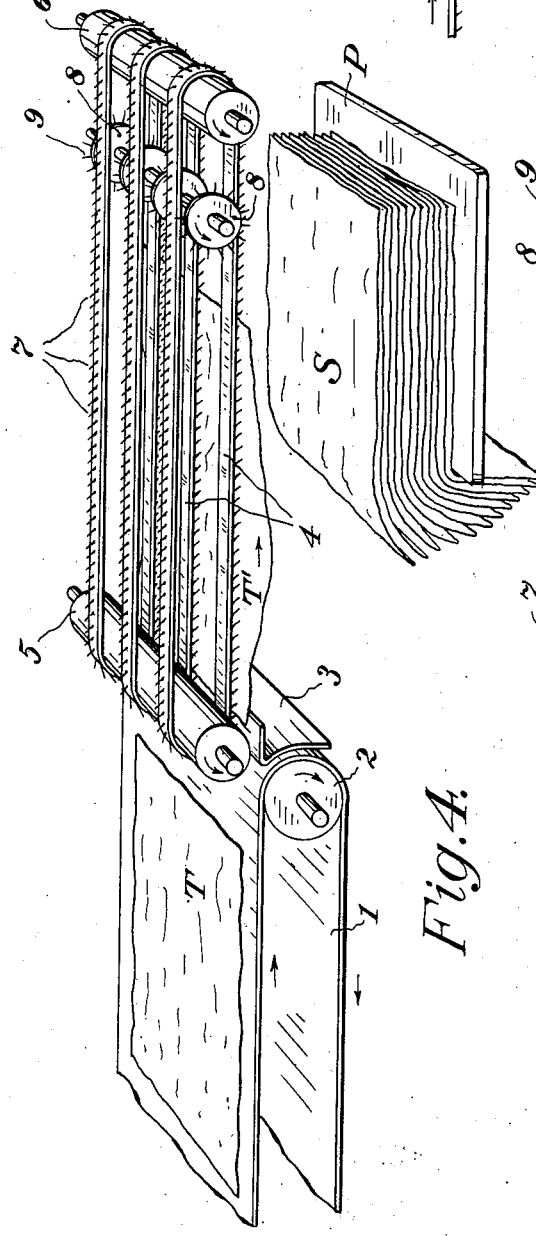
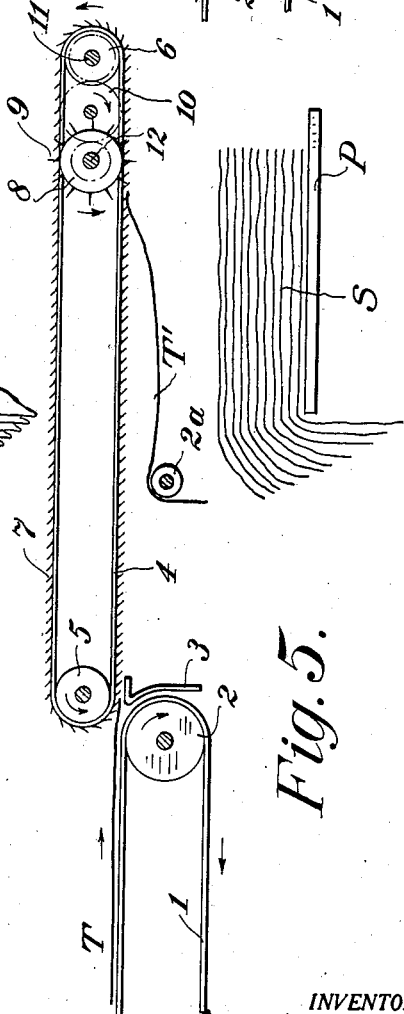
INVENTOR.
Joseph P. Remington
BY
Cornelius L. E Liet
his ATTORNEY.

April 9, 1935.  J. P. REMINGTON  1,997,267
LAUNDRY SYSTEM
Filed March 4, 1932   5 Sheets-Sheet 5
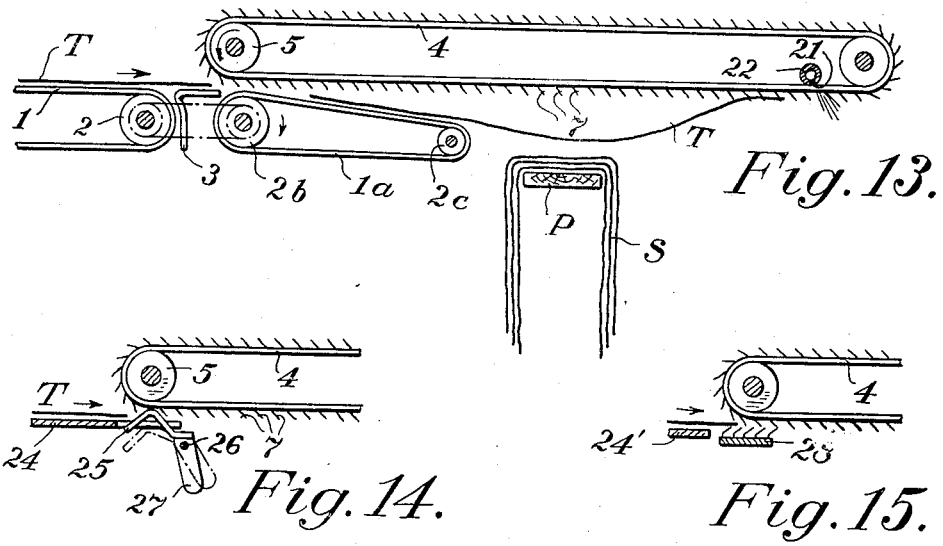
Fig. 13.
Fig. 14.
Fig. 15.
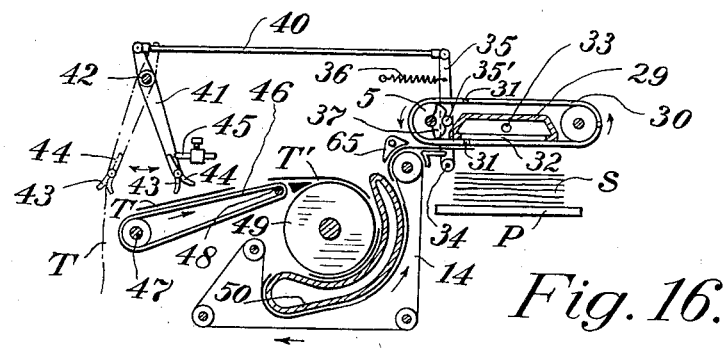
Fig. 16.
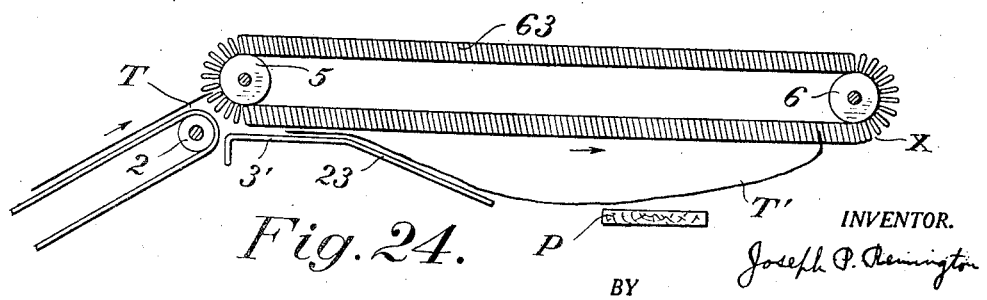
Fig. 24.
INVENTOR.
Joseph P. Remington
BY
Cornelius L. Ehret
his ATTORNEY.

Patented Apr. 9, 1935

1,997,267

UNITED STATES PATENT OFFICE 1,997,267

LAUNDRY SYSTEM

Joseph P. Remington, Philadelphia, Pa., assignor to Stokes and Smith Company, Philadelphia, Pa., a corporation of Pennsylvania Application March 4, 1932, Serial No. 596,774

27 Claims. (Cl. 68—9)

My invention relates generally to a system for feeding to a machine individual pieces of fabric, as cloth, and/or for automatically removing the pieces, after they have been operated upon by the machine, and arranging the pieces for further operations; more particularly, the invention relates to a laundry system in which individual pieces of laundry, for example, towels, napkins, or the like, are fed to a flat work ironer, the pieces being subjected to shaking and/or spreading during the feeding operation to remove wrinkles, creases, or overfolds therein prior to entry of the pieces into the ironer, and, preferably after inspection, the pieces are automatically removed or stripped from the take-off belt of the ironer and subjected to any one or more of various operations, as stacking, folding, baling, or wrapping, whereby the work is performed in greatly reduced time, and the output of the machine materially increased, with minimum labor and handling of the pieces.

The invention also relates to a method of and apparatus for feeding individual pieces of laundry to an ironer, folder, or other apparatus, in timed relation therewith; specifically, and in accordance with one modification, individual pieces of wet wash are fed to a flat work ironer, with the leading edges of successive pieces in predetermined spaced relation with respect to each other and, preferably, in timed relation with respect to stripping mechanism, folding apparatus, or other structure at the take-off end of the ironer.

In accordance with one form of the invention, the individual pieces of cloth or laundry are fed to a flatwork ironer or other apparatus, with the leading ends of successive pieces in predetermined spaced relation with respect to each other, preferably in timed relation with movement of stripper or other structure at the take-off end of the ironer; more particularly, clamps into which the edges of the cloth pieces are inserted by operators are actuated in timed relation, with respect to a stripper device, folder, or other structure for removing the pieces from the take-off belt of the ironer, and deposit the pieces on the feed belt of the ironer at given times and at a given rate.

In one modification the clamps comprise on arm which is caused to swing back and forth, preferably in timed relation with movement of stripper or other structure, over the feed belt of the ironer, carrying relatively fixed and movable jaws, biased toward closed position, between which the leading end of a piece of laundry is inserted by an operator; when the arm swings over the feed belt of the ironer, a movable jaw engages a stop member which causes the jaws to open and drop the piece on the feed belt.

In another modification, belt structure, carrying mechanical clamps, preferably travelling in timed relation with movement of stripper or other structure at the take-off end of the ironer, overlaps the feed belt of the ironer, and pieces inserted in the clamps are successively released at given times and places over the feed belt. While held in the clamps, the pieces are subjected by mechanical means, fluid blasts, or the like, to shaking movement to remove wrinkles, creases, or overfolds, and after deposit on the feed belt they are subjected to fluid blasts of air, or equivalent, directed against their opposite edges to stretch the pieces and remove any remaining wrinkles, creases, or overfolds.

It is the usual practice in laundries to employ operators to take off the flat work from the ironer. The output of the ironer is therefore limited by the speed of the operators, and if a large number of operators are employed to speed up the work, this not only results in an appreciable increase in cost of labor, but also causes congestion due to lack of space at the take-off end of the ironer.

Further in accordance with the invention, the leading ends of the cloth pieces on a traveling conveyor, specifically, the take-off belt of a flat work ironer, are successively stripped or picked up by traveling belt structure, or equivalent, having gripping or clamping means thereon; the pieces are maintained in the same relative positions they occupied on the conveyor, and are removed a sufficient distance therefrom to clear it, after which the leading end of each piece is released and the pieces drop in succession at the same place and pile in alignment in a stack upon a support from which, for subsequent operations, they may be removed manually, or automatically by mechanism such as disclosed, for example, in my copending application, Serial No. 594,194, filed February 20, 1932.

Specifically, and in accordance with one modification, the stripper comprises continuously moving belt structure, for example, carding cloth, having pins, needles or staples inserted in its surface with points inclined at an angle thereto in the direction of travel of the belt, which preferably moves at a higher speed than the conveyor belt; the carding cloth hooks into the leading edges of the cloth pieces as they arrive in succession at the discharge end of a conveyor belt, and carries the pieces by their leading edges to a given point where the edges are released, and the pieces dropped to form one or more stacks of superimposed pieces having edges in alignment.

The means for releasing the pieces from the carding cloth may comprise mechanical structure engaging the leading edges of the pieces at a given point, for example, disks or wheels rotating in the direction of travel of the pieces, and preferably at a slightly higher speed, with their peripheral surfaces engaging the leading edges of the pieces at the point where they are to be released; or air blasts may be directed against the leading edges of the pieces as they pass a given point for releasing them; or both mechanical structure and air blasts may be used.

In another modification, the stripper may comprise suction apparatus, as perforated belt structure travelling over a suction plate, and the suction released at a given point to drop the cloth pieces.

In other modifications, mechanical clamp means, for example a coiled spring belt passing over pulleys, may be employed to pick up the leading ends of the pieces where adjacent turns of the coil separate as they pass around a pulley; and the pieces may be released by separation of the turns as the spring passes around a second pulley.

In accordance with another modification, mechanical clamps on a moving belt may engage the leading ends of the cloth pieces, and release the pieces at a given point; the movement of the belt may be continuous or intermittent, in such timed relation with the conveyor belt as to bring the clamps in succession to position to clamp the leading edges of the pieces as they are advanced on the conveyor.

Further in accordance with the invention, the cloth pieces may be visually inspected as they travel on the conveyor or take-off belt; means are provided to prevent pick-up of rejected pieces by the traveling belt of the stripper structure, and so avoid need to disturb the pieces for inspection after they have been stacked; specifically, and in one modification, a plate normally guiding the leading edges of the cloth pieces into position where they are picked up by the stripper belt, is movable at will by the inspecting operator to a position which deflects rejected pieces into a receptacle; in another modification the rejected pieces are deflected between rollers in the conveyor structure which delivers them into a receptacle.

My invention resides in a system and apparatus of the character hereinafter described and claimed.

To describe my invention, and for illustration of some of the various forms it may take, reference is had to the accompanying drawings in which:

Fig. 1 is a diagrammatic view of a laundry system in accordance with my invention, having stripping and stacking apparatus at the take-off end of a flat work ironer.

Fig. 4 is a perspective view of one form of stripping and stacking apparatus in accordance with the invention.

Fig. 5 is a side elevational view of Fig. 1, showing individual pieces of cloth respectively in the stripping and stacking operation.

Figs. 6 and 7 are details of modified forms of certain parts employed in the stacking operation.

Fig. 8 shows a modified form of stripper structure.

Fig. 13 is a modification employing air blast mechanism in the stacking operation.

Figs. 14 and 15 show details of modified forms of certain parts of the stripper structure.

Fig. 16 shows feeding apparatus for a flatwork ironer in combination with a modified form of stripper structure operating in timed relation therewith.

Figs. 17 to 23 show details of various parts of the system of Fig. 1.

Fig. 24 illustrates another form of stripper structure.

Figure 2:
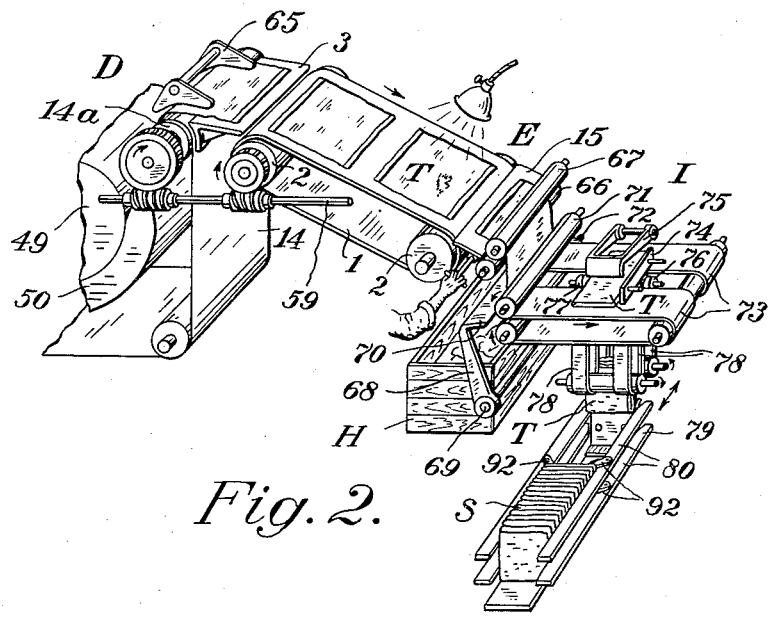
Figs. 2 and 3 show various forms of folding and stacking apparatus at the take-off end of an ironer in the system of Fig. 1.

Referring to Fig. 1, there is shown a laundry system comprising a feeder A for the individual pieces T of damp wash W, a shaker B, spreader C, ironer D, inspector and sorter E, stripper F, and stacker G. For purposes of illustration the system is shown as adapted for simultaneous operation upon two parallel rows or lines of pieces; it will be understood, however, that a single row, or any desired number of parallel rows, of pieces may be passed through such a system, if desired, dependent upon the width of the pieces, the size of the ironer, speed of operation, etc. One operator per line of pieces feeds the towels or other pieces of damp wash from hamper H', by inserting the leading edge of each piece between adjacent turns of a pair of coil springs 52, 52 secured to a belt 51 travelling around rollers 53, 53' at a constant predetermined speed. As the belt passes around the rollers, the adjacent turns of the spring coils 52 are separated, in the manner shown in Fig. 17, at which time the edge of the towel or other piece is easily inserted between the separated turns of the coils; after the belt has passed around the rollers the adjacent turns of the spring coils close, as shown in Fig. 18, so that the end of the towel is firmly clamped thereby. The coil springs are longitudinally spaced on the belt a predetermined distance apart, dependent upon the desired rate of feed and length of the pieces handled, and by requiring the operator to insert a piece between the turns of each pair of springs as they pass around the roller 53, a predetermined and increased output of the ironer is obtained. It will be understood that various other clamping means and feeding devices, for example, those hereinafter described with reference both to feeding and stripping apparatus, may be employed in lieu of the clamping and feeding means shown in Fig. 1. A shaker member 54 is preferably, although not necessarily, employed in combination with the belt 51, and as shown in detail in Figs. 19 and 20, comprises rollers 56 at opposite sides of the shaker. The shaker is revolved by a shaft 55 at sufficient speed to cause the rollers, which engage the lower side of the belt 51, to give a vibrating or whipping action thereto. This causes the towel T' to be rippled or shaken, as though the same were shaken by hand, and thus removes wrinkles, creases or overfolds therein. Various other shaker devices, for example, a rotating or vibrating paddle engaging either the towel or the belt, or fluid blasts of air or the like, as disclosed and claimed in my copending application, Serial No. 578,040, filed November 30, 1931, may be used in lieu of the shaker members shown, or in combination therewith.

The leading end of each towel or other piece is carried forward to the right hand roller 53', and as belt 51 passes around the roller, the adjacent turns of the spring coils 52 separate and release the towel, which falls and lies flat on a feed belt 46. The speed of belt 51 preferably is faster than the speed of the feed belt 46, so that the trailing end of the towel engages that portion of belt 46 passing over roller 47 to produce a drag upon the trailing end and insure release of the leading end of each successive towel at the same point. The speed of the belt 51 may be changed, or separate belts in the different rows or lines of pieces may be employed, and may have different speeds relative to each other, if desired, by changing the gear ratio of their driving means, or in any other suitable manner known in the art.

As the towels are carried forward on belt 46, blasts of air, or air mixed with steam, are caused to pass through pairs of nozzles 57 in a direction generally in the plane of the towels and outwardly toward the side edges of the towels to spread the same and remove creases, wrinkles or overfolds therein. Compressed air, or air and steam, is supplied to the nozzle structure 57 through a pipe line 58 from a source of supply, not shown. The air blast structure is preferably of the type disclosed and claimed in my co-pending application, Serial No. 578,040, hereinbefore referred to.

The towels of each line of pieces are successively delivered by belt 46 to the ironer, and are ironed by passing between the cylinder 49 and steam chest 50. After ironing, the towels are carried by an apron 14, passing around the outer surface of the steam chest in the direction of the arrow and around a roller 14a, and are directed by fixed concave members 65 onto a bridge member 3. From this member the towels are carried by a belt 1 passing around rollers 2, 2, which permits sorting or inspection of each piece for stains or holes. Rotatable bridge members or gates 15 are independently operable, and may be manually turned by an inspector to the position shown by one of them to by-pass a rejected piece into a hamper H.

Assuming the gates 15 to be turned (see Fig. 21) so that the towels T on belt 1 will pass across them, the leading ends of the towels of each line respectively will be engaged by mechanical clamp members 61 on stripper belt 60. Each of the clamp members comprises a cleat, shown in detail in Figs. 21 to 23, secured, as by rivets, at one side to the belt structure; the cleats close against the belt when the belt assumes a flat position, but as the belt passes around the roller 5, the cleats open to receive the leading edge of the towel, after which the cleats close to clamp the towel.

Fig. 1 shows a towel T' thus clamped, just prior to its release, which occurs when the belts 60 pass around roller 6, at which time the cleats open to release the towel so that the same falls in proper position in alignment on the stack S on support P, as hereinafter explained. The mechanical clamp structure may have either continuous or intermittent movement, but necessarily travels in timed relation, as by means of a driving shaft 59, with the feeding mechanism of the ironer. For convenience, a common driving shaft for the various elements or units of the system is shown, but it will be understood that any or all of them may be separately driven by various means known in the art.

Fig. 2 shows folding apparatus I at the take-off end of the ironer, instead of the stripping and stacking apparatus of Fig. 1. For convenience, a single line of pieces is shown; it will be understood that parallel rows or lines of pieces may likewise be folded, preferably by the provision of an individual folder per line. The type of folder shown makes one lateral fold and one longitudinal fold, in the following manner:

The towels from the sorting conveyor 1 normally pass over the gate 15 adapted to be turned by the inspector to by-pass rejected towels into hamper H. After passing onto the gate, each towel is engaged by rollers 66 and 67, driven in the direction of the arrows; the towel hangs down straight over the roller 66 so that a tucker 68 rotatably mounted at 69, and operating in timed relation with respect to the system, can tuck the towel between two driven rollers 71 and 72 to give a lateral fold. The driving means for various of the elements or units have been omitted more clearly to show their construction and operation; it will be understood that any suitable driving means may be employed, and that the elements or units will be driven in suitable timed relation relative to each other.

The towel is carried by belts 73 to the stop position shown, and another tucker 75 tucks it between rollers 76 and 77 to provide a longitudinal fold, after which the towel is carried downward between spring belts 78. A pusher plate 79 pushes the folded towels into a slideway 80 so as to arrange the folded product in a pile or stack S for subsequent operations, such as baling or wrapping. Spring or latch members 92 carried by the slideway keep the towels at the rear of the stack in upright position as they are added thereto by pusher plate 79.

Figure 3:
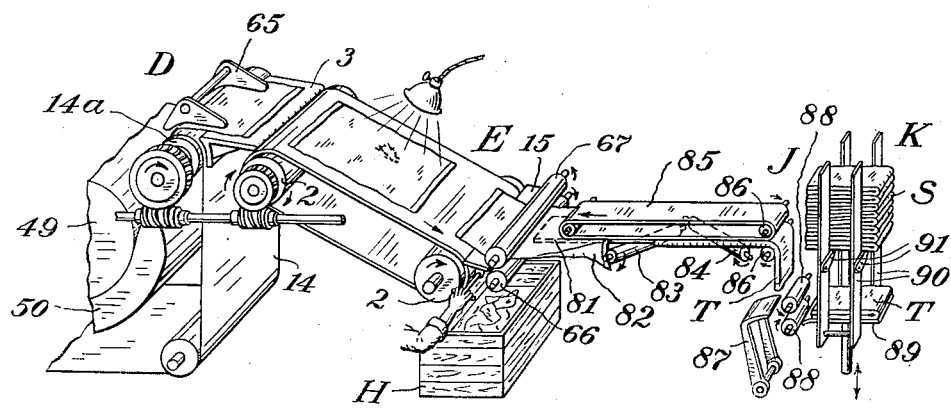

Fig. 3 shows a type of folder which provides two longitudinal folds and one lateral fold, as is customary with Pullman towels. After passing over the gate 15, the towel passes onto a rigidly mounted plate 81 which supports the central portion of the towel longitudinally. This plate is approximately one-third the width of the towel, so that the two sides 82 of the towel which hang down (only one of which is visible in Fig. 3) are as wide as the central supported portion. Two rollers 83 and 84, revolving in the direction of the arrows, respectively turn the sides inward and upward in sequence. The towel is pulled over the plate by an overhead belt 85, and passes between rollers 86 in the form of a three-ply fold; a tucker 87 then tucks the towel between rollers 88 to provide a lateral fold. The folded towels are successively pushed upward by an elevator 89 in stock holder 90, and are supported by latch members 91.

As shown, the folding and stacking devices of Figs. 2 and 3 may be employed in the system of Fig. 1 in lieu of the stripping and stacking apparatus illustrated. It will also be understood that various other devices, for example, counting, baling, or wrapping devices, may be connected to the system, either in addition to, or in lieu of, the devices shown. Also, one or more of the devices of the system, for example, the feeder, shaker, spreader, or sorter, may be replaced by other apparatus specifically different, or for various purposes may be omitted, and the various devices of the system may advantageously be employed with devices or machines for performing various operations, other than ironing, upon pieces of fabric or other material.

In the foregoing system, the pieces are fed synchronously or in timed relation with the movements of the stripper and folder mechanisms, but this is not necessary unless required by the particular mechanisms employed; for example, certain types of stripper structure hereinafter disclosed do not require timed feeding, and various types of folders may have mechanical or electrical devices which cause the folder to operate at the proper times, regardless of the manner in which the pieces are fed thereto in a manner well-known in the art. Where there is no necessary timed relation between the feeder and other mechanisms, or required rate of feed to the ironer, feeder structure of the type disclosed in my copending application Serial No. 578,040, filed November 30, 1931, may be employed.

Fig. 4 shows another form of stripping and stacking apparatus. A belt 1, passing around a pulley or roller 2, and travelling in the direction indicated by the arrows, comprises conveyor mechanism, such as the take-off belt of the ironer. The piece of cloth T, such as a towel, handkerchief, or the like, of each line of pieces is advanced by the belt 1 to a bridge member 3, over which it passes until its leading edge comes in contact with the under side of one or more belts 4 travelling around rollers or pulleys 5, 6, in the direction indicated by the arrows, which belts comprise an overhead conveyor for stripping the towel T off the belt 1, and for supporting and advancing the towel to a distance at least equal to its own length.

The belts 4 are provided with means for gripping or catching the leading edge of the towel T and carrying it by its leading edge to a given point where it is released and stacked. The means on the surfaces of the belts 4 for picking up or catching into the leading edge of the towel comprises, in the form illustrated in Fig. 4, a plurality of needles or staples 7 inserted in the belts, at an angle sufficient to maintain a grip on the leading edge of the towel to prevent it falling off in transit. Instead of needles or staples inserted in the belts, various grades of carding cloth may be employed for this purpose. The belts 4 are preferably driven at a higher rate of speed than the belt 1, and this causes the staples or carding cloth to hook into the leading edge of the towel, the back drag on the towel causing the staples or carding cloth to grip tighter under tension. It also prevents the staples of the belts from gripping that portion of the towel behind its leading edge, since after engagement of the staples with the leading edge, the towel is travelling at the speed of the belts 4, and there is no further hooking effect.

The type of continuous surface stripper shown in Fig. 4 has the advantage of picking up towels which have crooked or slanting leading edges, without disturbing their side edge alignment on the conveyor belt. After the towel is carried forward a distance to clear the belt 1, it is necessary to release the same at a given point, and for this purpose, wheels or disks 8 carrying pins 9 in their peripheral edges, extend below the belts 4 to exert a downward pressure on the leading edge of the towel as the same reaches this point. The wheels or disks 8 are caused to rotate in the direction indicated by the arrow, and preferably at a rate of speed which causes the pins 9 to travel faster than the leading edge of the towel at the point of engagement therewith. This gives a forward movement or jerk to the leading edge of the towel and thereby causes its release from staples 7, so that the towel will fall on a support P to form a stack S, with the leading edges of the towels in alignment. Since the release of the towels occurs at the same point, irrespective of the length of the towel, or its position on the take-off belt 1, each towel will be properly superimposed on the preceding towel of the stack S, supported by the table or platform P from which the stacks may be removed from time to time by an operator.

The platform P is preferably shorter than the length of the towels or pieces to be stacked in order to permit the trailing edges of the pieces to hang over the platform, and this prevents the trailing edges from rolling or turning back as each piece is laid on the stack. The speed of the belts 4, and the position of wheels 8, are preferably such that the trailing end of the towel engages the stack at, or just prior to, the time of release of the leading end, so that its trailing end provides an anchor to prevent volplaning or side slipping as the towel drops down.

In Fig. 4 the towel T lying on the take-off belt 1 of the ironer is approaching the stripping point, and another towel T' in advance of towel T is being advanced by the belts 4 to the stacking point. Towel T' sags of its own weight, and its trailing end drops off bridge 3 onto the stack S, at which time, or immediately thereafter, its leading end is released by the pins 9 in the wheels 8.

In Fig. 5, one towel T is in the position where its leading edge is caught or picked up by the belts 4, the leading edge being supported at that point by bridge 3. The leading edge is immediately gripped by the pins 7, and follows the path of the previous towel T' shown in the position in which it is released by the wheel 8. As shown, the wheels 8 may be driven by a spur gear 10 interposed between differential spur gears, indicated by dot-dash lines on shafts 11 and 12.

Fig. 5 also shows the use of an idler roller 2a, which supports the trailing end of the towel and also produces a slight back drag on the towel. This prevents the towel from being jerked forwardly due to release of back-drag thereon as the trailing end leaves the belt 1, which forward jerking has a tendency to release the leading end from the staples 7 at the wrong time. The trailing end of the towel may remain on the roller 2a until engaged by the succeeding towel, at which time it will be rolled off and will gently fall in place. The roller 2a also provides an anchorage for the trailing end of the towel as the leading end drops down, and may be used in the various other stripper arrangements illustrated.

Fig. 6 shows a modified form of releasing wheel 8a, having a roughened surface 9a, for example emery cloth, which engages the leading edge of the towel to cause its release from the pins 7 of belt 4.

Fig. 7 shows a further modified form of wheel 8b, having teeth 9b for engaging and releasing the leading edge of the towel. As in the case of the wheels 8, the peripheries of the wheels 8a and 8b preferably travel at a higher rate of speed than the belts 4.

Fig. 8 shows a stripper arrangement in which the roller 5 is mounted in such position that the leading edge of a starched or stiff towel or other piece will strike into the pins or staples of belts 4 while the towel is still on the roller 2. As the towel moves forward in the direction of the arrow, the staples of the belts engage and pick up the leading edge of the towel.

Figure 9:
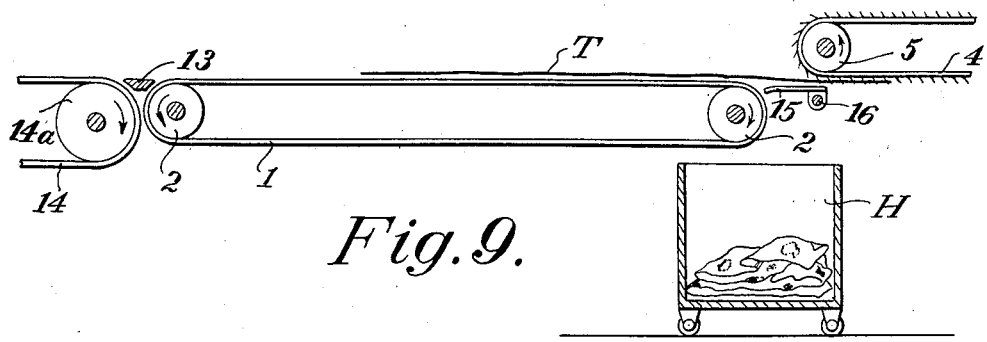
Figs. 9 and 10 illustrate the operation of inspecting and sorting mechanism in combination with the stripper structure.
Figure 10:
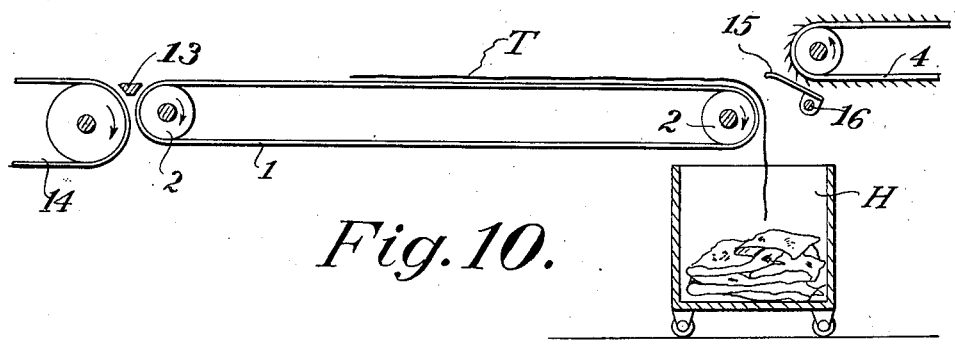

To avoid the need of disturbing the towels or other pieces for inspection after they have been stacked, means are provided for visual inspection and sorting prior to engagement of the pieces by the stripper belts. Figs. 9 and 10 show a sorting conveyor belt 1 travelling about pulleys or rollers 2 in the direction indicated by the arrows, and adapted to receive towels or other pieces from the belt 14 representing the take-off belt of the flatwork ironer. A wedge-shaped bridge member 13 is positioned intermediate the belts 1 and 14 to facilitate transfer of the towel from belt 14 to belt 1. The two conveyors 1 and 14 may be mounted horizontally as shown, or at any other convenient angle with reference to each other so as to economize space and still provide a length of the laundry or conveyor sufficient to inspect the laundry pieces. The towel T has been advanced by the belt 1 to a position where its leading edge has crossed a bridge or gate 15, and has been engaged by the stripper belts 4.

The bridge 15 is mounted on a rock shaft 16, by which means the bridge may be moved by an inspector to the position shown in Fig. 10, thus causing a rejected towel to be by-passed into the hamper H, as shown in the latter figure.

Figure 11:
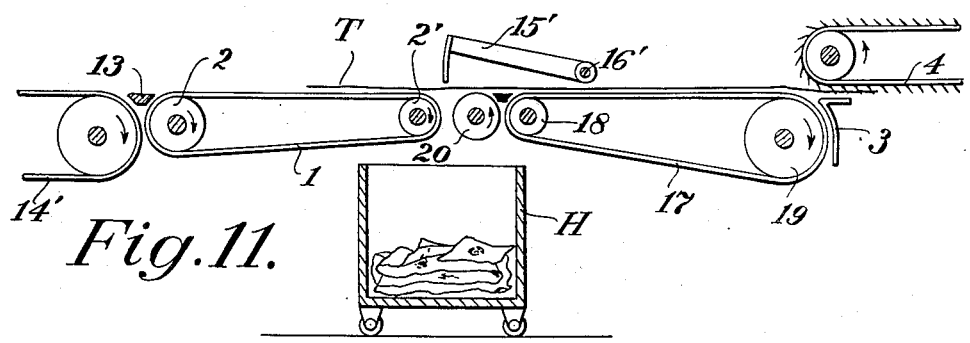
Figs. 11 and 12 are modified forms of sorting mechanism.
Figure 12:
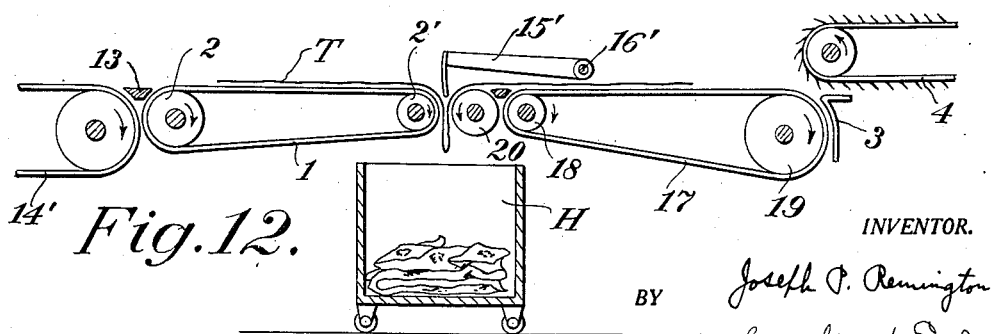

Figs. 11 and 12 show a modified form of by-passing structure for rejected pieces. In this modification the sorting means comprises two belts 1 and 17, separated by a roller 20 revolving constantly in the direction of the arrow. The belt 17 passes about rollers or pulleys 18 and 19 travelling in the same direction as belt 1, but the roller 20 moves in a direction opposite the direction of travel of belts 1 and 17. The roller 20 is mounted close to rollers 2' and 18, so that towels or other pieces may pass readily over the roller.

Fig. 11 shows a towel T which has been passed by the inspector and is in position to be stripped by the belts 4.

Fig. 12 shows a rejected towel which is by-passed into a hamper H, the inspector having moved a blade 15', pivotally mounted on a rock shaft 16', downwardly so as to cause the towel to be engaged by the roller 20 and conveyor 1, and thus pass into the hamper.

Fig. 13 shows a modified form of means for releasing the leading edges of the towels or pieces, in which air jets from openings 21 in a conduit or pipe line 22 containing a supply of air under pressure, are caused to impinge upon the leading edge of each towel or piece as it reaches the proper point, for causing release of the leading edge, and permitting the towel to fall in alignment on the stack. The direction of flow of the air jets is in the general direction of movement of the leading edge of the towel, and the force of the jets may be varied, as by valve means, not shown, so as to cause the leading edge to be released without blowing the same out of alignment.

The support P for the stack S is in the form of a bar, instead of a table, and the pieces are dropped so that their central portions fall on the bar, with their ends hanging over; this support is particularly well adapted for small pieces, such as handkerchiefs, or for flimsy material, as silk, rayon, etc., which might wrinkle if dropped on a flat table; by the use of a relatively narrow bar the ends of the pieces are caused to drop by gravity and thus avoid wrinkling. If the stack is removed from the bar by picking up both hanging ends of the pieces at the same time, the edges of the pieces will come into alignment, or the pieces may be shuffled slightly to give edge alignment.

Fig. 13 also shows a belt 1a, passing around rollers 2b and 2c, travelling at the same rate as belt 1 to maintain a slight drag on the trailing end of the towel T or other piece, until its leading end is released, after which the continued movement of belt 1a will cause the trailing end of the towel to fall in place.

Fig. 14 shows a modified form of stripper structure, in which a finger member 25, pivotally mounted as at 26, has a weight 27 which normally keeps the finger raised to the position shown in full line. The finger operates through a slot in plate member 24, and is positioned between adjacent belts 4 so that it does not engage the staples 7. One or more fingers may be employed, and cause the leading end of the piece T to be forced upwardly into positive engagement with the staples. This arrangement is particularly advantageous for heavy materials, which are apt to fall off the staples unless a positive engagement therewith is secured. After the edge of the towel or other pieces engages the finger, it forces the same down to the position shown by the dotted lines, and since the piece is now travelling at the same speed as belts 4, the finger does not cause engagement of other than the leading edge of the piece with the staples.

Fig. 15 shows a stationary flexible piece 28 of carding cloth, or equivalent, positioned adjacent the end of bridge member 24', the carding cloth causing positive engagement of the leading end of the towel with the needles or staples 7, and adapted to be flexed downwardly after the leading edge of the towel is engaged.

Fig. 16 shows feeding apparatus for a flatwork ironer in combination with a modified form of stripper structure. In the arrangement shown, the stripper comprises a suction pan or chamber 29 having a slot 32 extending along and positioned immediately above the lower side of each of the belts 30, the belts having groups of holes 31 therein at spaced intervals, and cooperating with the slots in the suction chamber to pick up the leading edge of the towel. A partial vacuum in the chamber 29 is maintained by means of a pipe line 33 connected to exhaust apparatus, not shown, of any desired type suitable for the purpose. The leading edge of the towel is caused to reach the forward or left hand end of the slots 32 at the time that one of the groups of holes in each belt reaches this point, so that the holes will pass over the leading edge of the towel at this point, and the suction through the holes in the belt will cause the leading end of the towel or other piece to be picked up and carried forward to the right hand end of slots 32, at which latter point the suction will be released and the towel dropped.

In this arrangement the stripper belts may travel either continuously or intermittently, but it is necessary that they move in timed relation with feeding mechanism at the input end of the ironer, or other apparatus, through which the towels or pieces are passed, that is, the groups of holes in the belts must reach a position at the forward end of slots 32 in the suction pan at the same instant that the leading edge of the towel reaches this point. To obtain the desired timed relation, an arm 35, mounted on rock shaft 34, has a roller or cam member 35' extending therefrom, and coacting with the camming surface of the disk or cam 37 which rotates at the same speed as roller 5. The member 33 is continuously biased, as by spring 36, so that its cam roller 35 is in continuous engagement with the cam surface of disk 37, and the member is connected by means of the link or rod 40 to a rocker arm 41 mounted on rock shaft 42, so that arm 41 moves in timed relation with respect to stripper belts 30.

The rocker arm 41 carries, at its lower end, a pair of clamps comprising a relatively fixed jaw 43, and a movable jaw 44 pivotally mounted and biased into engagement with the fixed jaw by spring means, not shown. As the rocker arm is swung to the position indicated by dotted lines, the leading edge of the towel or other piece of wet wash is inserted between jaws 43 and 44 by an operator; when the arm swings over the feed belt 46 of the flatwork ironer, the movable jaw 44 engages a fixed stop member 45, which causes the jaws to open and drop the towel on the feed belt. The feed belt travels around pulleys 47 and 48 at a constant rate of speed, so that the leading ends of the successive pieces T and T' are in predetermined spaced relation with respect to each other, and in timed relation with the stripper structure. After passing through the flatwork ironer and around the steam chest 50 by means of the apron 14 travelling at a constant rate of speed, the leading ends of the towels will successively reach the forward end of slots 32 in the suction pan at the proper time to have a group of holes 31 in the stripper belt structure cause pick-up of their leading ends.

The movement of the lower end of rocker arm 41 is preferably faster than movement of the feed belt 46, so that the trailing end of the piece inserted between clamping jaws 43 and 44 will fall against the end of the belt 46 at roller 47, and this produces a slight back drag on the piece which insures release of its leading end at the proper place, and tends to prevent wrinkles or overfolds in the piece when the same is dropped. It will be understood that either the feeding or stripping devices may be used to replace similar devices in the various other arrangements shown, and that the feeding and stripping devices of the various other arrangements may be used to replace the devices of Fig. 16.

Fig. 24 shows a stripper belt 63 in the form of a helical spring, the adjacent turns of which open as the spring passes around the roller 5 so that the leading edge of the towel will be inserted therebetween, and as the belt passes from the under-side of the roller, the adjacent turns of the spring close to firmly clamp the leading edge of the towel and convey it to the point x at roller 6, where the adjacent turns are again opened and the towel released.

Fig. 24 also shows a modified form of bridge member 3', having a sloping surface 23 which maintains a slight drag on the trailing end of the towel T' until its leading end is released, the surface 23 also providing an anchorage for the trailing end as the towel is dropped. It is immaterial whether the trailing end falls off the surface 23, since it will be brushed off by the leading end of the succeeding towel T.

What I claim is:

1. In the art of laundering, the method which comprises passing individual pieces of laundry along a predetermined path, ironing and sorting the pieces as they travel along said path, removing rejected pieces before they reach a predetermined point in said path, and successively removing the remaining pieces as their leading ends reach said predetermined point.

2. In the art of laundering, the method which comprises passing individual pieces of laundry along a predetermined path, ironing and sorting the pieces as they travel along said path, by-passing rejected pieces before they reach a predetermined point in said path, and successively removing the remaining pieces as their leading ends reach said predetermined point.

3. In the art of laundering, the method of stripping and stacking pieces of laundry, which comprises passing said pieces along a predetermined path at a given speed, successively picking up the leading edges of the pieces as they reach a given point in said path, transporting the pieces by their edges at a speed greater than said given speed, and stacking the pieces in edge alignment by dropping in succession the trailing and leading edges of each piece.

4. The method of sorting and stripping pieces of cloth which comprises passing said pieces along a predetermined path, diverting rejected pieces to a different path, successively picking up the remaining pieces as their leading edges reach a given point in said predetermined path, transporting the last-named pieces a predetermined distance, and there successively dropping the pieces into a pile in edge alignment.

5. In combination, conveyor structure for successively delivering individual pieces of cloth to other conveyor structure travelling generally in the same direction as the first-named conveyor, means for driving the first of said conveyors at lower speed than the other, and structure for so positioning the conveyors with respect to each other that the one traveling at lower speed engages the trailing end of each piece of cloth to produce a back drag thereon at the time of delivery.

6. In combination with an ironer having a feed belt, means for delivering individual pieces of cloth to the feed belt comprising means moving above the feed belt in the general direction of travel thereof, said means adapted to carry each piece by its leading end and successively to release the pieces at a predetermined point with relation to the feed belt, said means travelling at a faster rate than said feed belt so that the trailing end of each piece will engage the feed belt to produce a back drag on the piece prior to release of its leading end.

7. In combination with an ironer having a feed belt, structure for successively delivering individual pieces of laundry to the feed belt, means for shaking said pieces as they are carried by said structure, and means for fluid blasting the pieces as they travel on said feed belt, to remove wrinkles, creases, or overfolds.

8. In combination with an ironer, feed belt structure for feeding individual pieces of laundry to the ironer with the leading ends of successive pieces in predetermined spaced relation with respect to each other, means for shaking the pieces as they advance, and means for applying fluid blasts thereto, to remove wrinkles, creases, or overfolds therein.

9. An ironer having take-off conveyor structure, means for sorting the pieces as they travel on said conveyor and for by-passing rejected pieces, means for stripping the remaining pieces from the conveyor comprising means for successively engaging the pieces as their leading ends reach a predetermined point, means for transporting the pieces a predetermined distance from the conveyor, and means for piling the pieces with edges thereof in alignment comprising means for causing the pieces successively to be released as they reach a given point.

10. A laundry machine comprising an ironer having take-off belt structure, means for successively removing the pieces from the take-off belt as they reach a predetermined point, means for successively folding the pieces after they are removed, and means for stacking the pieces after they are folded.

11. In combination with a conveyor carrying individual pieces of cloth, stripping apparatus comprising travelling belt structure having a plurality of elements pointed in the direction of travel of the belt and adapted to catch in the pieces as their leading ends reach a given point and for transporting the pieces a predetermined distance from the conveyor, and means for piling the pieces with edges in alignment comprising means for causing the pieces successively to be dropped as their leading edges reach a given point.

12. Belt structure having a plurality of pointed elements having their ends inclined in the direction of travel of the belt and adapted to catch in cloth pieces as they reach a given point and for transporting the pieces a desired distance from the conveyor, and means for causing the pieces successively to be dropped as they reach a given point to pile them with edges in alignment.

13. In combination with an endless conveyor carrying individual pieces of cloth, stripping structure comprising a belt, means for driving said belt in the same direction and at a higher speed than the conveyor, means on said belt for successively engaging the cloth pieces as their leading edges reach a given point during transport by said conveyor and for transporting the pieces a predetermined distance from the conveyor, and means for piling the pieces with edges in alignment comprising means for causing the pieces successively to be dropped as their leading edges reach a given point.

14. In combination with a conveyor carrying individual pieces of cloth, stripping belt structure having means successively engaging the pieces as their leading edges reach a given point and for transporting the pieces a predetermined distance from the conveyor, and means for piling the pieces with edges in alignment comprising means exerting a force having a component acting in the direction of travel of the pieces successively engaging the pieces and causing them to be dropped as their leading ends reach a given point.

15. In combination with a conveyor carrying individual pieces of cloth, stripping belt structure having means successively engaging the pieces as their leading ends reach a given point and for transporting the pieces a predetermined distance from the conveyor, and means for piling the pieces with edges in alignment comprising a rotating member having a surface moving in the direction of travel of the pieces and engaging the pieces to free them as their leading ends reach a given point.

16. In combination with a conveyor transporting individual pieces of cloth, stripping apparatus comprising travelling belt structure having a plurality of pointed elements inclined in the direction of travel of the belt, and means for directing the leading ends of said pieces to be caught by said elements for transport by said belt structure.

17. In combination with a conveyor transporting individual pieces of cloth, stripping apparatus comprising travelling belt structure having a plurality of pointed elements inclined in the direction of travel of the belt, and movable structure for directing the leading ends of said pieces to be caught by said elements and depressed by the trailing portion of said pieces as they are transported by said belt structure.

18. In combination with a conveyor transporting individual pieces of cloth, stripping structure comprising a belt travelling in generally the same direction and at higher speed than said conveyor, and pointed elements carried by said belt and inclined in the direction of its movement for catching the leading ends of said pieces and removing them from said conveyor.

19. In combination with a conveyor carrying individual pieces of cloth on the lower flight thereof, means effecting release of the pieces as they reach a predetremined point to allow them to drop toward a stack of pieces, and structure disposed between said conveyor and said stack devoid of movement in the direction of feed of said pieces and spaced from said releasing means by a distance less than the length of the pieces being stacked so that as each piece is released, the trailing end thereof depending to the rear of said structure provides a frictional drag retarding the fall of the trailing end toward the stack.

20. In combination with an ironer, structure for suspending pieces to be ironed and moving them in suspended position toward the ironer, and means for vibrating said structure to shake the suspended pieces free of wrinkles, creases, and overfolds.

21. In combination with a flatwork ironer, a feeding means comprising means for holding the pieces of laundry a predetermined distance apart, a take-off belt, means for stripping the pieces from the take-off belt comprising means for successively picking up the pieces as their leading ends reach a given point, said feeding and stripping means operating in timed relation to each other, and means for folding the pieces longitudinally and laterally operating in timed relation to said feeding means and receiving the pieces from said stripping means.

22. An ironer having take-off belt structure for conveying the ironed pieces along a path in which they are visible for inspection, stacking mechanism, a conveyor therefor having its receiving end adjacent the discharge end of said take-off belt, and structure interposed between said take-off belt and said conveyor operable by an inspector to divert pieces from the conveyor or to support pieces for transfer to said conveyor.

23. An ironer having structure for discharging the ironed pieces of laundry, means for successively gripping the discharged pieces as their leading ends reach a certain point and for transporting them, and means for piling the pieces with edges thereof in alignment comprising means for causing the pieces successively to be released as they reach a given point.

24. A laundry machine comprising an ironer having structure for discharging the ironed pieces, means for successively removing the discharged pieces from said structure as they reach a predetermined point, means for successively folding the pieces after they are removed, and means for stacking the pieces after they are folded.

25. An ironer having structure for discharging the ironed pieces of laundry along a path, a conveyor adjacent said path for engaging said pieces as their leading ends reach a predetermined point in said path regardless of the spacing between successive pieces and immediately transferring them therefrom, and means for piling the pieces with edges in alignment comprising means for causing the pieces to be dropped from said conveyor as they reach a given point.

26. An ironer having structure for discharging the ironed pieces of laundry along a path, a conveyor, structure movable in response to arrival of the leading edges of said pieces at a predetermined point in said path and operable to effect driving engagement of said conveyor with said pieces, and means for piling the pieces with edges in alignment comprising means for causing the pieces to be dropped from said conveyor as they reach a predetermined point.

27. In the art of laundering, the method of stacking pieces, which comprises passing said pieces along a predetermined path, gripping said pieces as their leading ends reach a predetermined point in said path regardless of the spacing between them, and at once moving the pieces in succession from said point to a second point, and at said second point dropping the pieces in succession to pile them in edge alignment in stack formation.

JOSEPH P. REMINGTON.